Oct. 27, 1970 W. L. MEISEL ET AL 3,536,944

GRID CUP FOR A TELEVISION PICTURE TUBE

Filed March 8, 1968 2 Sheets-Sheet 1

GRID CUP FOR A TELEVISION PICTURE TUBE

Filed March 8, 1968 2 Sheets-Sheet 2

INVENTORS
WILLIAM L. MEISEL
BY WILLIAM M. ERSKINE
Amster & Rothstein
ATTORNEYS

United States Patent Office 3,536,944

Patented Oct. 27, 1970

3,536,944

GRID CUP FOR A TELEVISION PICTURE TUBE

William L. Meisel and William M. Erskine, Emporium, Pa., assignors to Emporium Specialties Co., Inc., Austin, Pa., a corporation of Pennsylvania Filed Mar. 8, 1968, Ser. No. 711,780
Int. Cl. H01j *1/48, 29/50, 31/00*
U.S. Cl. 313—82 3 Claims

ABSTRACT OF THE DISCLOSURE

An improved grid cup for a television picture tube molded as a unitary part of powdered metal such that there is an optimum wall thickness in the body and the orientation of the mounting lugs to the body is, without any adjustments, in strict accord with operating specifications.

The present invention relates generally to improvements for a cathode ray tube such as a monochrome or color television picture tube, and more particularly to an improved grid cup construction and fabrication.

As generally understood, a television tube includes a voltage gun assembly consisting in a monochrome tube of a single subassembly of an anode, focus, screen and control grid cups, and in a color tube of three such subassemblies. In one exemplary tube construction, the grid cups are located adjacent to each other along the tube axis and it is important, in the voltage gun assembly, that the control apertures of the various grid cups be in strict alignment with each other. This strict alignment is in large part dependent upon the accuracy of the assembly of the elements of current prior art grid cup assemblies, all known embodiments of which include at least two such elements, namely, the grid cup and the mounting lugs attached circumferentially about the grid cup. Despite advances in technology in the production of a typical currently available grid cup assembly, including automated assembling apparatus in which the grid cup and mounting lugs are automatically jigged up for assembly, there is still significant loss due to inaccuracy in the assembly of the parts.

Broadly, it is an object of the present invention to provide a more readily produced and improved cathode-ray tube grid cup. Specifically, it is an object to provide a grid cup which is readily produced to exacting specifications and in the fabrication of which errors in alignment and orientation of its structural features or elements are significantly minimized.

An embodiment of a television tube grid cup demonstrating objects and advantages of the present invention is fabricated of powdered metal as a unitary molded part with the mounting lugs thereon in a precise, predetermined angular orientation to the body or grid cup of the part; thus, the part is readily adapted, when used in a voltage gun assembly, to contribute to accurate alignment of the apertures of similarly fabricated parts, all to the end of improving the efficiency and performance of monochrome and color television tubes.

The above brief description, as well as further objects, features and advantages of the present invention, will be more fully appreciated by reference to the following detail description of presently preferred, but nonetheless illustrative embodiments in accordance with the present invention, when taken in conjunction with the accompanying drawings, wherein:

FIGS. 1–5, inclusive, illustrate prior art constructions of television grid cup assemblies, namely to wit:

FIG. 2 is similarly a side elevational view illustrating the prior art construction in an assembled condition; and FIG. 3 is a front elevational view thereof best illustrating a perpendicularity error between the strap support and grid cup;

FIG. 7 is a side elevational view thereof illustrating advantageous structural features derived from the unitary molded construction of the improved grid cup;

FIG. 8 is a side elevational view illustrating further advantageous structural features;

FIG. 9 is a side elevational view, in section taken along line 9—9 of FIG. 7, illustrating the variable thickness of the cylindrical wall of the body of the grid cup;

FIG. 10 is a side elevational view, taken in section along lines 10—10 of FIG. 8, illustrating further structural features;

FIG. 11 is a side elevational view of a voltage gun assembly having plural improved grid cups according to the present invention;

FIG. 12 is a front elevational view, in section taken on line 12—12 in FIG. 11, illustrating structural features of the voltage gun assembly;

FIG. 13 is a side elevational view, with a part of the body of the grid cup assembly broken away and in section, illustrating the two elements which comprise the second embodiment preparatory to their assembly together;

Figures 10, 11, 12, 13, 14, 15:
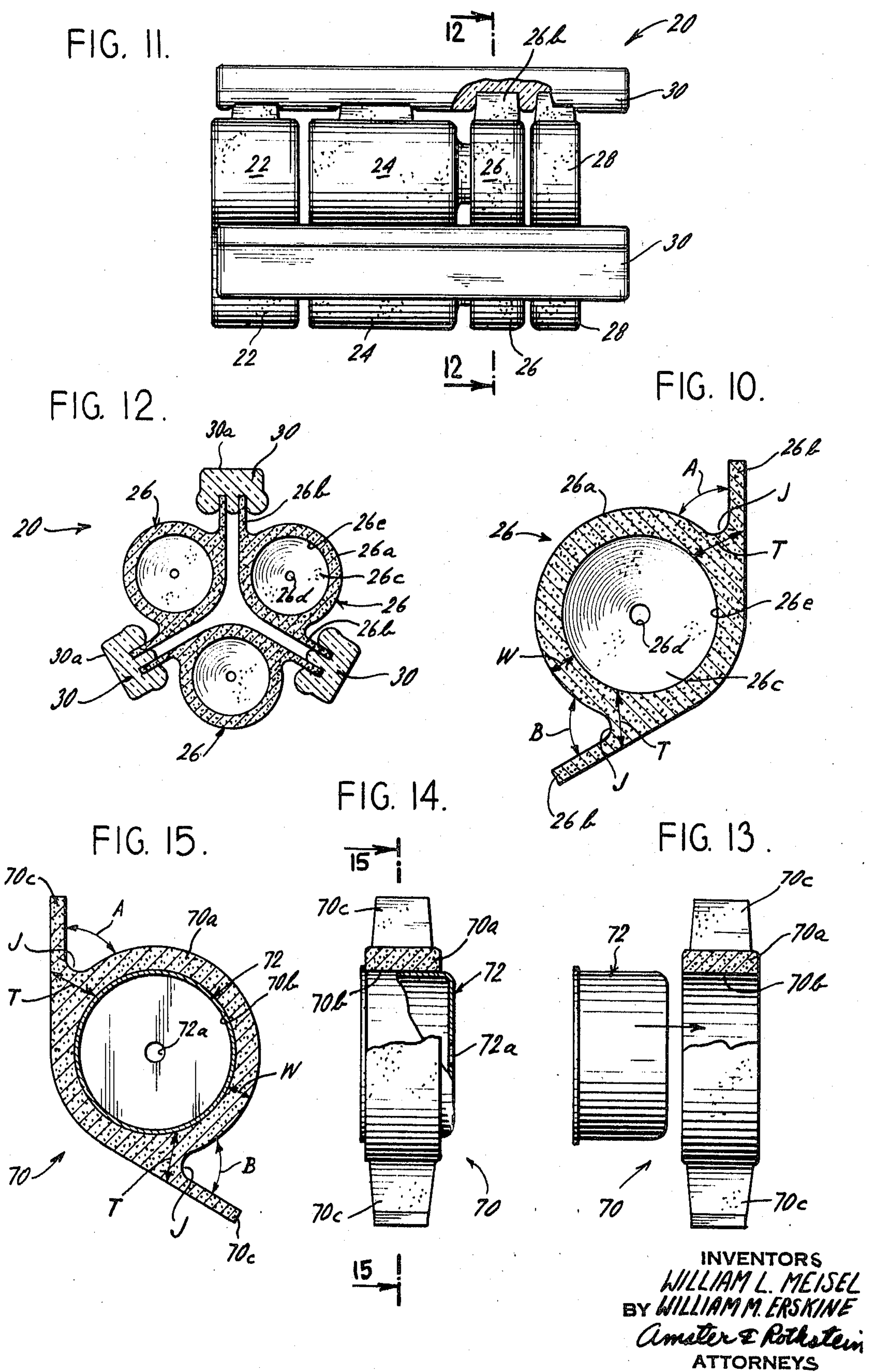
FIGS. 13–15 illustrate a second embodiment of an improved grid cup assembly according to the present invention namely to wit.

FIG. 14 which is a side elevational view similar to FIG. 13, but illustrating the two elements in an assembled condition; and FIG. 15 is a front elevational view, in section taken on line 15—15 of FIG. 14, illustrating further structural features of the second embodiment.

Reference is now made to FIG. 11 illustrating a typical voltage gun assembly, generally designated 20, which is adapted in practice to be inserted into the neck of a color television picture tube and consequently has three subassemblies of grid cups which, starting from the left in FIG. 11, includes an anode grid cup 22, a focus grid cup 24, a screen grid cup 26, and a control grid cup 28. It will, of course, be understood that an embodiment of the voltage gun assembly 20 adapted for use in a monochrome television picture tube would have only one subassembly of grid cups 22, 24, 26 and 28. For present purposes since the invention resides in an improved construction and fabrication of the grid cups used in the voltage gun assembly 20, it is immaterial whether the tube is for monochrome or color. Further, since the improved construction and fabrication can advantageously be used for any one or all of the grid cups and is identical for each whether it be embodied, for example, in the anode grid cup, or in any one of the other mentioned grid cups, for brevity's sake, only one grid cup will be described in detail. The grid cup selected for this purpose is the screen grid cup 26 which is more particularly illustrated in FIGS. 7–10 and in the sectional view of FIG. 12.

Referring to FIGS. 7–10, the screen grid cup 26 will be understood to be a part which, in accordance with the present invention, is molded as a unitary element having a generally cylindrical cup-like body 26a, and in the embodiment selected for illustration herein, two laterally extending mounting lugs 26b which, at the juncture J, are substantially tangential to the body 26a. Additionally, as clearly illustrated in FIG. 10, the thickness T of the wall defining the cylindrical body 26a is greatest at the juncture J. Completing the construction of the screen grid cup 26 is a bottom wall 26c which at a medial location has the usual aperture 26d through which, in the operation of the television picture tube and in a well understod manner, the electrons are beamed when being fired along the axis of the television picture tube to a precise target on the television picture tube screen. For reasons which also are well understood it is necessary for efficient operation of the television picture tube to have accurate aperture alignment of the various grid cups or else the electron beam will not pass through the aperture mask located downstream of the grid cups nor will it excite the preselected dots on the television screen to produce the picture on the screen in strict accordance with the in-coming signals to the television picture tube.

To the end of providing the desired alignment in the aperture holes of the various grid cups, as clearly shown in FIG. 11, the grid cups 22, 24, 26 and 28 are arranged adjacent each other, with the apertures 26d of each aligned with each other along the axis of the television picture tube when the voltage gun assembly 20 is inserted into the neck of the tube. Specifically, the various grid cups 22, 24, 26 and 28 are held in an assembled condition, as illustrated, by the circumferentially spaced glass support heads 30 and, in this assembled condition, are appropriately supported in a clearance position within the neck of the tube.

Within the operating environment as just described, the improved features of the grid cups, as exemplified by the screen grid cup 26, consists of the unitary molded construction, the comparatively greater extent in the wall thickness W of the cylindrical wall 26a throughout the major portion of its radial extent and particularly the increased wall thickness T at the juncture J, the achievement of the precise, predetermined angular orientations A, B at which the mounting lugs 26b extend from the circular body 26a, and also other features referred to subsequently herein.

Figures 1, 2, 3:
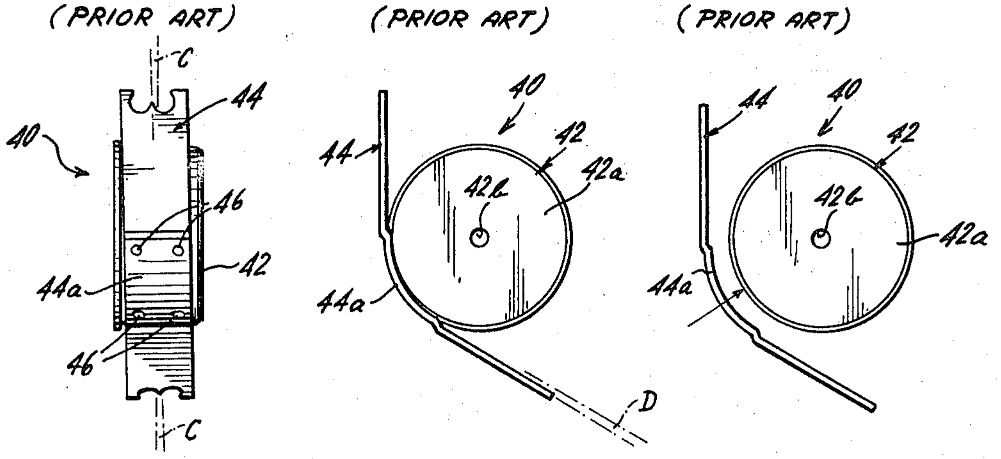
FIG. 3. (PRIOR ART) FIG. 2. (PRIOR ART) FIG. 1. (PRIOR ART)
FIGS. 1–3 illustrate a grid cup assembly comprising a grid cup of a so-called strap support, FIG. 1 being a side elevational view thereof illustrating said elements preparatory to their assembly together.

The foregoing can perhaps best be understood by a comparison with typical prior art constructions as shown, for example, in FIGS. 1–6 to which reference is now made. In FIGS. 1–3 there is illustrated a grid cup assembly 40 which in accordance with prior art techniques and practices consists of two die stamped metal parts which are assembled by being welded together. Specifically, the assembly 40 includes a grid cup 42 having a bottom wall 42a and a centrally located aperture 42b, and as the other element a so-called strap support 44, the medial portion 44a of which is, in practice, spot welded, as at 46, to the exterior of the grid cup. Despite advances in technology in the production of grid cup assemblies as exemplified by the assembly 40, including automated assemblying apparatus in which the grid cup 42 and strap support 44 is automatically jigged up for assembly, there are still many completed assemblies which are not suitable for use because of inaccuracies and errors in the manner in which the two parts are put together. This is illustrated in FIG. 3 wherein the longitudinal axis of the support strap 44 (shown as a dot dash line) is several degrees displaced from the position it was intended to occupy, thereby producing what is known as a perpendicularity error to the extent of the angle C. Such an error, if in the order of five to six degrees, will result during the operation of the television tube in arcing along the surface bounding the aperture 42b. Still another type of displacement error is illustrated by the angle D in FIG. 2 wherein the lower portion of the support strap 44 circumscribes a greater angle with the exterior wall of the grid cup 42 than is intended or, more important, than is required in order to properly position the aperture 42b either in alignment with the other apertures of the voltage gun assembly or on the axis of the television tube in which the grid cup assembly 40 is used. An error in angular orientation of one of the extending portions of the strap support 44 does not usually render the completed assembly useless, however, since it is common practice to bend or otherwise adjust the angular orientation of the extending portions of the strap support to the proper angles required. The need to make this adjustment, however, is costly and time consuming.

Figure 5:
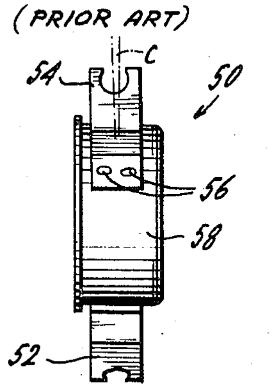
FIG. 5. (PRIOR ART)
FIGS. 4 and 5 are similar to FIGS. 2 and 3, respectively, but illustrate a grid cup assembly comprising a grid cup and so-called semi-strap support.
Figure 4:
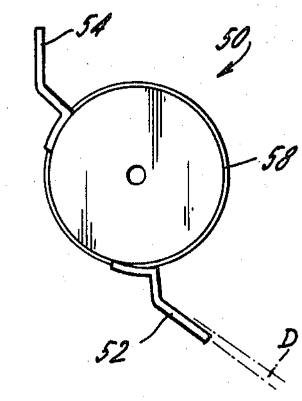
FIG. 4. (PRIOR ART)

In FIGS. 4, 5, still another embodiment of a prior art grid cup assembly 50 is illustrated. This assembly is similar to assembly 42 except that in place of the strap support 44 use is made of so-called semi-strap studs 52 and 54 which, by common practice, are spot welded, as at 56, to the exterior of the grid cup 58. As may generally be appreciated, the prior art embodiment 50 is also subject to misalignment errors C and D which adversely effect efficient operation of the television picture tube in which this part is used.

Figure 6:
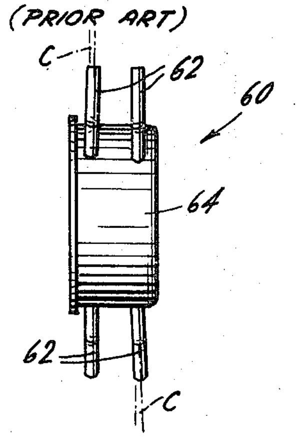
FIG. 6. (PRIOR ART)
FIG. 6 is a front elevational view of still another prior art construction including in the place of the strap and the semi-strap supports a group of spot welded pins.
Figure 9:
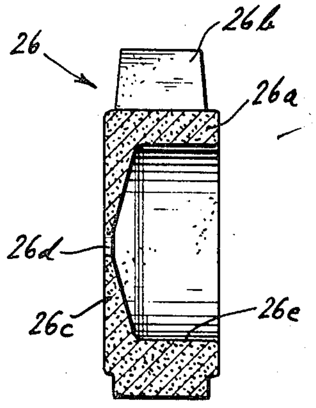
FIGS. 7–12 illustrate a first embodiment of an improved grid cup according to the present invention. Specifically
Figure 7:
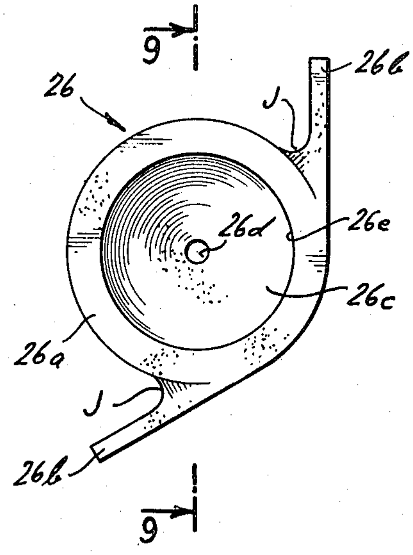
Figure 8:
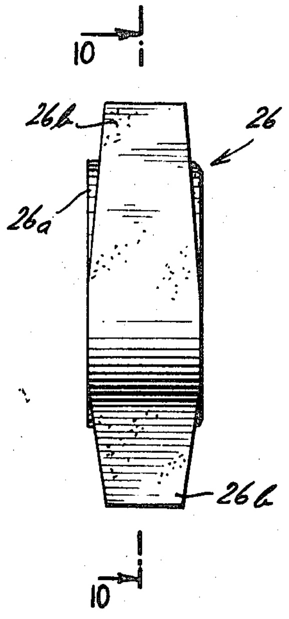

Another commonly used embodiment of a grid cup assembly is illustrated in FIG. 6 and generally designated 60. As shown, assembly 60 has four pins 62 spot welded to the grid cup 64. Again, as may be readily appreciated, assembly 60 is similarly subject to a perpendicularity error C or other error as may occur during the spot welding of the pins 62 to the body 64.

In contrast to the prior art constructions of FIGS. 1–6, the improved grid cup construction, as exemplified by the screen grid cup 26, is free, for all practical purposes, from defects attributable to misalignment and/or misorientation between the mounting lugs 26b and the body 26a. In addition, since the improved grid cup 26 is fabricated as a unitary molded article, it is possible and advisable to provide a comparatively greater extent in the wall thickness W of the cylindrical body 26a and, as already noted, to provide maximum thickness T at the juncture J of the lugs 26b with the cylindrical body 26a. Although the invention is not limited to a grid cup having any specific dimensions, a commercially acceptable screen grid cup produced in accordance with the present invention was molded from powdered metal in the shape as illustrated in FIG. 10 wherein the cylindrical opening 26e of the body 26a was three eighths of an inch, the wall thickness W one sixteenth of an inch, and the thickness T one eighth of an inch.

Although not limited to a molding process of any specific parameters the aforesaid commercially acceptable screen grid cup 26 was fabricated of a powder mixture consisting essentially of SAE 305 chrome nickel austenitic steel with .75% steric acid added for lubrication of tools. The mixture was mixed and tumbled so as to be dispersed evenly throughout. The dispersed mixture was then placed in an appropriate mold of a conventional design and compressed to shape using a twenty ton R4 Stokes Press. After molding, the shaped powdered metal part was placed on a carbon boat and inserted into a belt furnace having a controlled ammonia atmosphere at a temperature of twenty-three hundred degrees Fahrenheit for twenty-eight minutes in the hot zone of the furnace. The resulting product possessed sufficient structural stability and strength to efficiently function for the purposes intended and additionally, as already noted, had a relative orientation between the parts 26b and 26a, as well as dimensions W, T produced in the molding necessary for properly controlling the electrons beamed through the voltage gun assembly 20.

Attention is now directed to a second embodiment of an improved grid cup, generally designated 70, illustrated in FIGS. 13–15. This improved part is similarly advantageously fabricated as a unitary molded object and includes a cylindrical body 70a formed not with a bottom wall but with a cylindrical opening 70b throughout its entire axial extent and of a size appropriate to accommodate in a force fit a die stamped grid cup 72 which may be similar to any of the grid cups 42, 58 or 64 of the prior art embodiments of FIGS. 1–6. That is, the grid cup 72 having the aperture **72*a* therein has an operative assembled position, as illustrated in FIG. 14, within the cylindrical opening 70*b* of the member 70 which serves as a grid cup holding frame. In other respects, however, the member 70 possesses all of the advantages of the previously described embodiment including integral mounting lugs 70*c* molded with the proper angular orientation B to the body 70*a* and having the increased thickness T at the juncture J. A minor disadvantage of the embodiment 70 is the possibility of loosening of the grid cup 72 from its friction fit engagement within the opening 70*b* due to differential expansion and contraction of the grid cup 72 and the grid cup frame 70*a*. On the other hand, the construction of FIGS. 13–15 is particularly advantageous for the focus grid cup 24** as illustrated in FIG. 11 which has the largest axial extent and therefore is more readily produced in a metal drawing operation rather than in a molding operation.

From the foregoing it should be readily appreciated that the improved grid cup embodiments of FIGS. 7–12 and FIGS. 13–15 represent noteworthy advances in the art in that the improvements thereof minimize losses due to defective manufacture of grid cups and also substantially improve the operation and efficiency of both monochrome or color television picture tubes by providing a more effective aperture alignment for controlling the beaming of electrons to the screen of the particular tube.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In a voltage gun assembly of a cathode-ray tube wherein plural grid cups each having an aperture therein are arranged in a supported clearance position within said cathode-ray tube with said apertures in alignment with each other along a beam axis of said cathode-ray tube, the improvement being in that each said grid cup consists of a unitary molded body of compressed metal powder having plural mounting lugs thereon, said body including a wall oriented transverse to said beam axis having said aperture therein and each said mounting lug extending laterally from said body in a predetermined angular orientation whereby said aperture of each said grid cup is positionable along said beam axis during the production of said voltage gun assembly without adjustment in said angular orientation of said mounting lugs.

2. The improvement in a cathode-ray tube voltage gun assembly of a grid cup as defined in claim 1 wherein said body is formed as a cylindrical wall and said mounting lugs extend tangentially thereof, said wall being of a variable thickness throughout its radial extent and having its greatest thickness at the juncture with each said mounting lug.

3. The improvement in a cathode-ray tube voltage gun assembly grid cup as defined in claim 1 wherein said wall thereof which is oriented transverse to said beam axis is part of a cup-like structure mounted in an opening in said body of said grid cup.

References Cited

UNITED STATES PATENTS 2,202,588 5/1940 Kniepkamp ---------- 313—82
2,443,916 6/1948 Kelar --------------- 313—82

JAMES W. LAWRENCE, Primary Examiner

V. LAFRANCHI, Assistant Examiner

U.S. Cl. X.R.

313—70, 311